May 24, 1960  J. F. SCOTT ET AL  2,937,454
APPARATUS FOR DRYING GELATINOUS MATERIAL
Filed Jan. 30, 1956  4 Sheets-Sheet 1
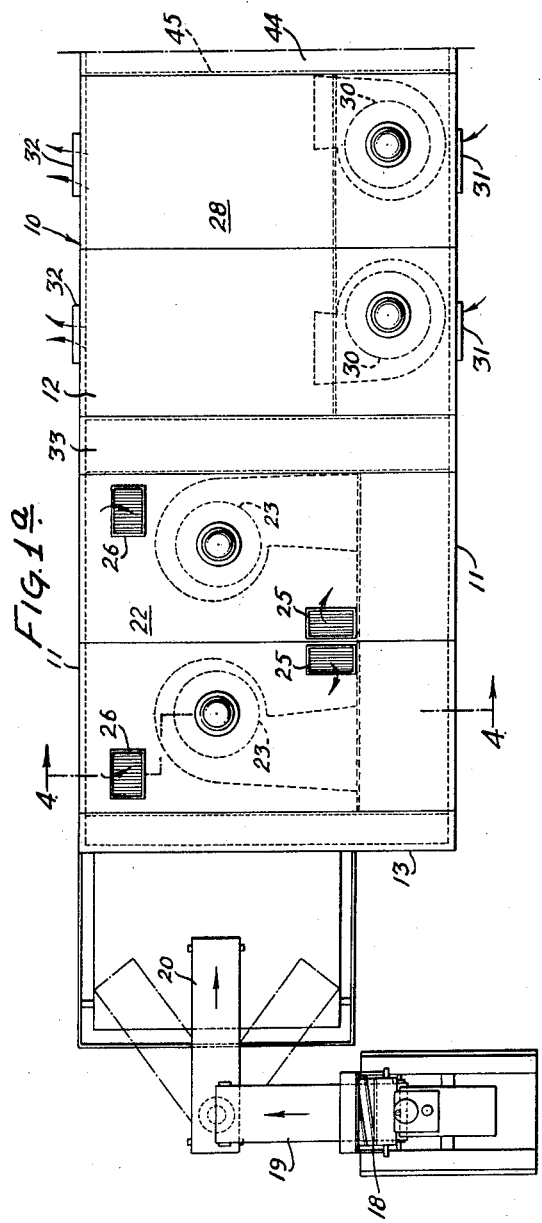
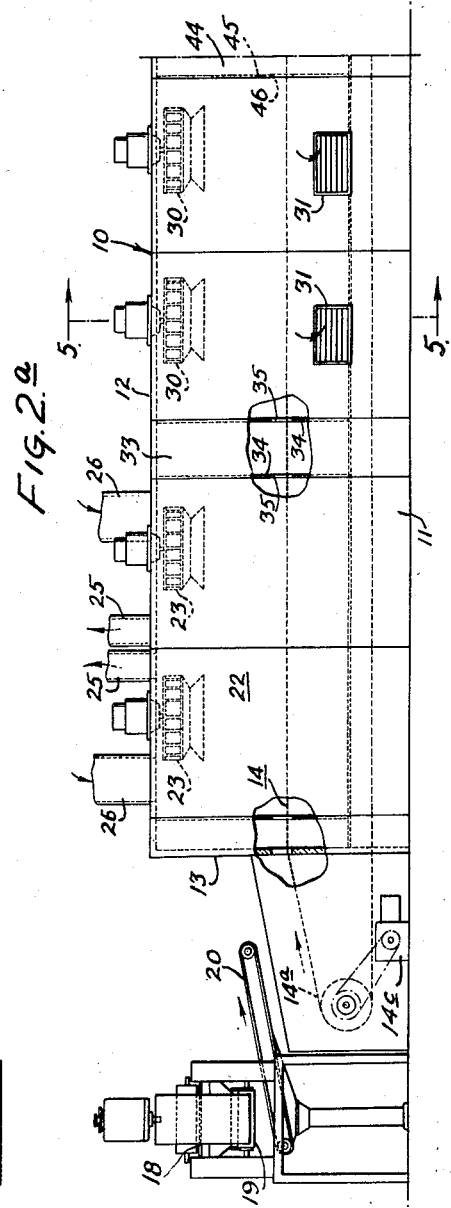
Inventors:
John F. Scott
Myron T. Fleming
Robert E. Fink
by Howson & Howson
Attys.

May 24, 1960 J. F. SCOTT ET AL 2,937,454
APPARATUS FOR DRYING GELATINOUS MATERIAL
Filed Jan. 30, 1956 4 Sheets-Sheet 2
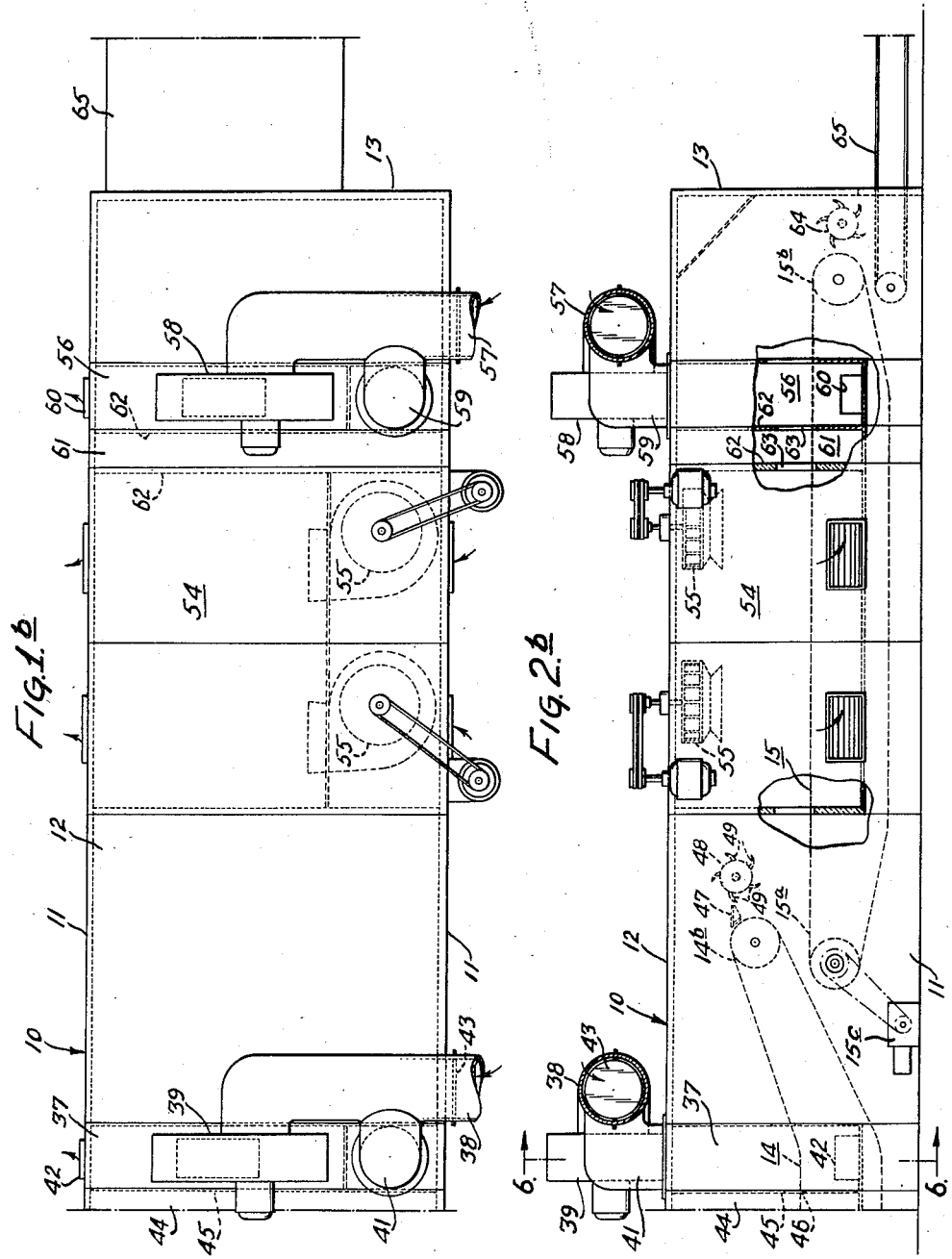
Inventors:
John F. Scott
Myron T. Fleming
Robert E. Fink
by Howson & Howson
Attys.

May 24, 1960  J. F. SCOTT ET AL  2,937,454
APPARATUS FOR DRYING GELATINOUS MATERIAL
Filed Jan. 30, 1956  4 Sheets-Sheet 3
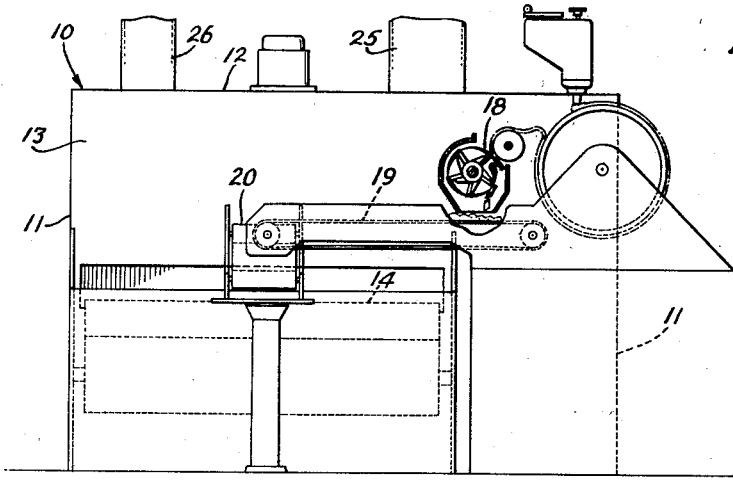
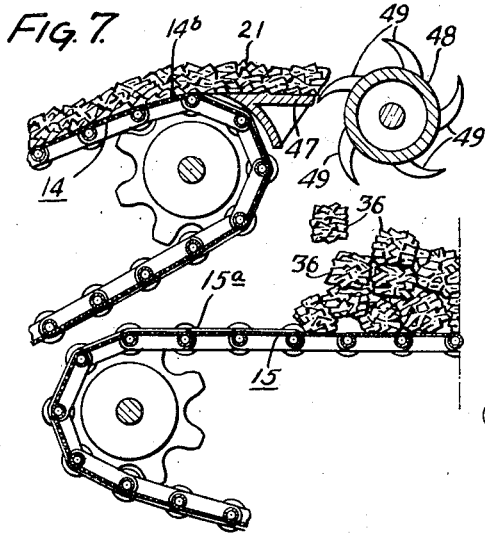
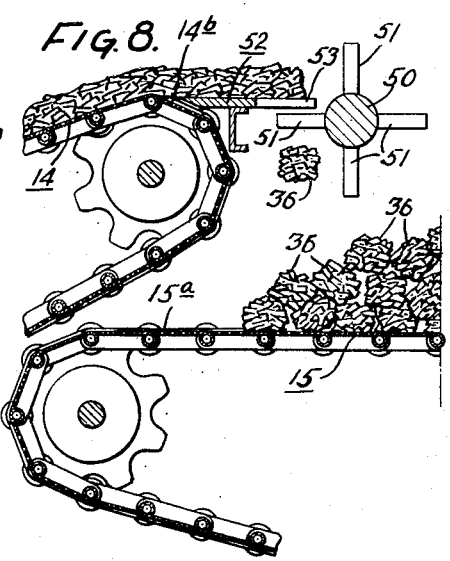
Inventors:
John F. Scott
Myron T. Fleming
Robert E. Fink
by Howson & Howson
Attys.

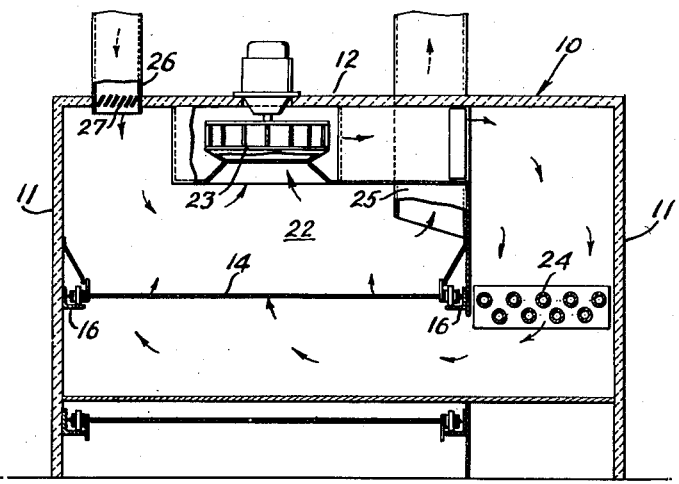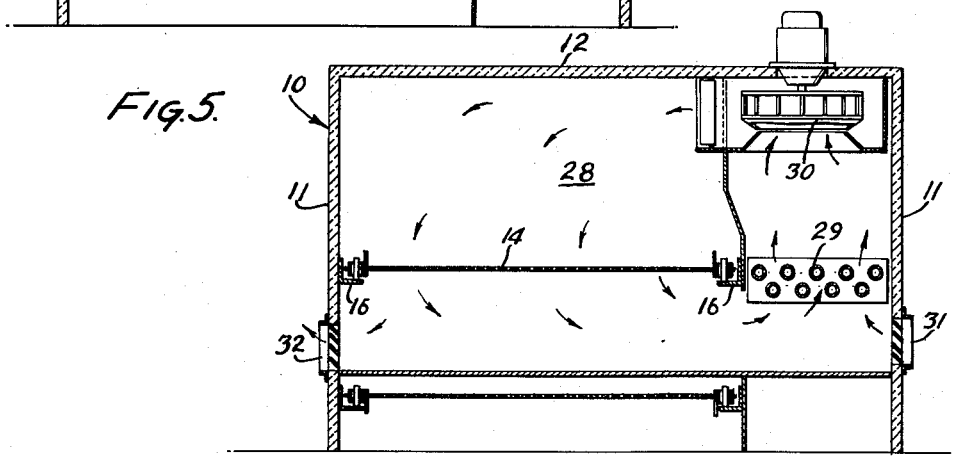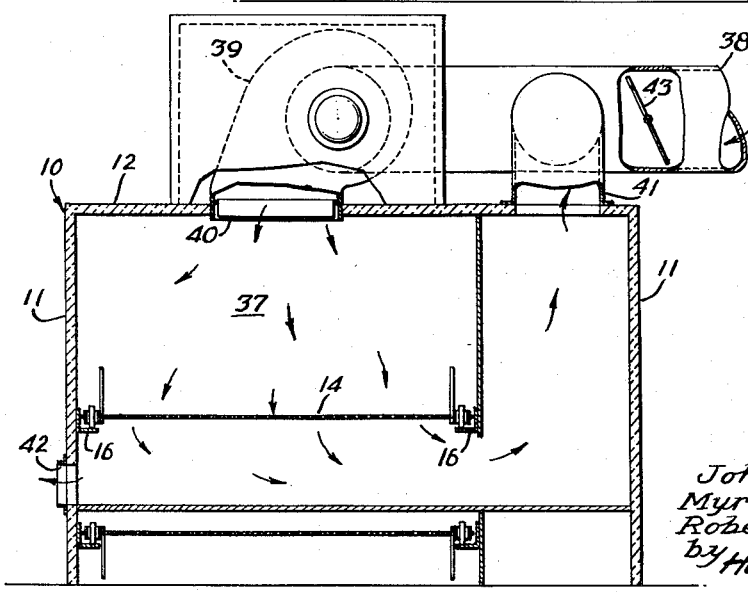

United States Patent Office 2,937,454
Patented May 24, 1960

2,937,454
APPARATUS FOR DRYING GELATINOUS MATERIAL

John F. Scott, Oreland, and Myron T. Fleming, Wyncote, Pa., and Robert E. Fink, Haddonfield, N.J., assignors to Proctor & Schwartz, Inc., Philadelphia, Pa., a corporation of Pennsylvania Filed Jan. 30, 1956, Ser. No. 562,128

6 Claims. (Cl. 34—66)

The present invention relates to new and useful improvements in apparatus for drying gelatinous material, and more particularly to new and useful improvements in apparatus for drying gelatinous material in a porous mass, dividing the material into generally uniform segments prior to completion of the drying operation and discharging the dried material in condition for further treatment or use without any manual handling of the material.

The principal object of the present invention is to provide an efficient apparatus wherein gelatinous material, such as glue, may successively be jelled, dried, and prepared for further treatment or use without requiring any manual handling.

Another object of the present invention is to provide novel apparatus wherein jelled strips of gelatinous material, such as glue, may be deposited on a conveyor in a porous strip form of uniform thickness and partially dried, thereafter being formed into porous generally uniform rectangular segments desposited on a conveyor for further drying.

A further object of the present invention is to provide novel apparatus for forming a continuous porous belt-like strip of partially dried gelatinous material, such as glue, into generally uniform rectangular segments of the porous material which may be easily handled, and completing the drying of the gelatinous material while in the porous segmental form.

A still further object of the present invention is to provide novel apparatus having the features and characteristics set forth which are relatively simple and entirely efficient and effective in operation and use.

These and other objects of the present invention and the various features and details of the operation and construction thereof are hereinafter more clearly set forth and described in conjunction with the accompanying drawings, in which:

Fig. 1a is a plan view of the front portion of the machine of the present invention;

Fig. 1b is a plan view of the rear section of the machine shown in Fig. 1a;

Fig. 2a is a side elevational view of the front portion of the machine of Fig. 1a;

Fig. 2b is a side elevational view of the rear portion of the machine of Fig. 1b;

Fig. 3 is a front end elevational view of the apparatus of the present invention;

Fig. 4 is an enlarged transverse sectional view taken on line 4—4, Fig. 1a;

Fig. 5 is an enlarged transverse sectional view taken on line 5—5, Fig. 2a;

Fig. 6 is an enlarged transverse sectional view taken on line 6—6, Fig. 2b;

Fig. 7 is an enlarged longitudinal sectional view illustrating the mechanism for cutting the continuous belt of partially dried gelatinous material into generally uniform segments of the material and then depositing the same on a second conveyor for further drying;

Fig. 8 is an enlarged longitudinal sectional view similar to Fig. 7 illustrating a modified form of apparatus for forming the rectangular segments of the gelatinous material.

Referring more specifically to the drawings and particularly to Figs. 1 and 2 thereof, reference numeral 10 designates generally a dryer constructed in accordance with the present invention comprising a housing consisting of insulated side, top and end walls 11, 12, and 13, respectively. A pair of endless foraminous conveyors 14 and 15 of conventional construction extend longitudinally of the drier housing and are supported by tracks 16, 16 mounted interiorly of the housing. Conventional drive mechanism, not shown, drives the two conveyors 14 and 15 with the conveyor 14 traveling at approximately five to eight times the speed of the conveyor 15. The feed end 14a of the first conveyor 14 extends beyond the feed end of the drier and the discharge end 14b thereof projects angularly upward and terminates at a point slightly beyond the mid-point of the drier housing. In a similar manner, the feed end 15a of the second conveyor 15 is positioned beneath the discharge end 14 of the first conveyor while the discharge end 15b of the second conveyor terminates within the discharge end of the drier housing, as illustrated in Fig. 2b.

The liquid gelatinous material to be treated according to the present invention is chilled in sheet form and cut into small pieces by chill roll cutting and feeding apparatus, designated generally as 18, as shown in Figs. 1a and 2a. This chill roll cutting and feeding apparatus 18 is the subject of a prior application by John F. Scott and Charles E. Hoffman, entitled "Chill Roll Cutting and Feeding Apparatus and Method," filed March 19, 1954, and assigned Serial No. 417,460, which application has become and now stands abandoned. The chilled cut pieces of gelatinous material are removed from the chill roll cutting and feeding apparatus 18 by a conveyor 19 and deposited thereby on an oscillating feed conveyor 20 of conventional construction which oscillates back and forth between the broken line positions shown in Fig. 1a and deposits the cut chilled pieces of the gelatinous material on the feed end 14a of the conveyor 14 to form a continuous belt of material 21 thereon approximately three inches thick.

In accordance with the present invention the continuous belt of chilled strips of gelatinous material is conveyed through a first drying chamber 22 at the feed end of the drier housing by the conveyor 14. With reference to Figs. 2a and 4, in the present embodiment of the invention, a drying medium, such as air, maintained at a temperature of approximately 90 to 110° F. is drawn upwardly through the foraminous conveyor 14 and the gelatinous material 21 supported by the conveyor 14 to start the initial drying of the gelatinous material. When drying certain light weight materials, however, the drying medium must first be forced downwardly through the bed of material. The flow of the drying medium is caused by a pair of motor-driven fans 23, 23 mounted in the top wall 12 of the drier housing which discharge the drying medium laterally and circulates the drying medium downwardly through a heating unit 24 designed to maintain the drying medium at the desired temperature and then back into the lower portion of the first drying chamber 22 and upwardly through the conveyor 14 and gelatinous material 21. A portion of the drying medium is exhausted from the first drying chamber 22 by means of exhaust ducts 25, 25 which project downwardly into the drying chamber and terminate at a point upwardly adjacent one side edge of the conveyor 14. Fresh drying medium is introduced into the drying chamber 22 by means of inlet ducts 26, 26 which terminate in louvered openings 27 in the top wall of the drier housing.

The conveyor 14 transports the gelatinous material at a uniform speed through the first drier chamber 22 into a second drier chamber 28 constructed as illustrated in Figs. 1a and 5 wherein the gelatinous material is further dried. In the second drying chamber 28 a drying medium, such as air, heated to approximately 90 to 110° F. is drawn upwardly through a heating unit 29 by means of a pair of motor-driven fans 30, 30 which discharge the heated drying unit laterally and force the same downwardly through the gelatinous material 21 and foraminous conveyor 14. The drying medium is then recirculated through the heating unit 29 by the fans 30, 30. A louvered opening 31 positioned in the side wall of the drier housing beneath the heating unit 29 permits fresh drying medium to be drawn into the drying chamber 28, while a second louvered opening 32 in the wall opposite the opening 31 permits a portion of the used drying medium to be discharged from the drying chamber 28. The two drying chambers 22 and 28 are separated from each other by means of a vestibule 33 as illustrated in Fig. 2a which is formed by a pair of spaced apart walls 34, 34 having elongated openings 35, 35 therein through which the conveyor and the gelatinous material pass. The vestibule 33 provides a dead air space between the first and second drying chamber 22 and 28, respectively, to prevent interference in the circulation of the drying medium in the opposite directions in the two chambers.

The gelatinous material is not completely dried when it leaves the second drying chamber 28. However, before completion of the drying operation, the layer of gelatinous material in porous strip form 21 is removed from the first conveyor 14 and cut into generally rectangular segments 36 and deposited on the second conveyor 15 in a porous layer approximately 15 to 24 inches thick. The second conveyor 15 is moved longitudinally through the drier housing at a speed approximately one-fifth to one-eighth of the speed of the first conveyor 14 and the drying of the gelatinous material is completed while the material is being conveyed through the drier housing by the second conveyor 15. By this construction the gelatinous material is maintained in the drier housing for a sufficiently long enough time to permit the gelatinous material to be dried to the desired final moisture content and eliminates the necessity for an extremely long drier housing. The conveyors 14 and 15 may be driven at the different speeds specified above by means of separate conventional drive mechanism, such as, a pair of electric motors and gear reducing units 14c and 15c drivably connected with the conveyors 14 and 15 respectively, for example as shown in Figs. 2a and 2b.

In accordance with the present invention, before the continuous porous belt 21 of gelatinous material supported by the conveyor 14 is cut into segments 36 it is passed through a cooling chamber 37, constructed as illustrated in Figs. 1b, 2b, and 6 of the drawings, wherein the gelatinous material is chilled to permit the partially dried gelatinous material to be easily cut into the segments 36. Air maintained at a temperature of approximately 75 to 85° F. is drawn through an inlet duct 38 by means of centrifugal blower 39 and then directed downwardly through an opening 40 in the top wall of the drier housing into the cooling chamber 37. The cooling air is drawn downwardly through the continuous porous belt of gelatinous material and the conveyor 14 to the bottom section of the cooling chamber 37. The cooling air is then recirculated through the centrifugal blower 39 by means of a connecting duct 41 which interconnects the chamber 37 with the inlet duct 38. An outlet opening 42 is provided in the lower portion of the cooling chamber 37 beneath the conveyor 14 to permit a portion of the cooling air to be removed from the chamber 37. In addition, an adjustable valve leaf 43 mounted in the inlet duct 38 controls the amount of new cooling air which may be admitted to the chamber 37.

A dead air space 44 is provided intermediate the cooling chamber 37 and the drying chamber 28 to insulate the chambers from each other. This dead air space 44 is formed by a means of a pair of spaced apart parallel walls 45, 45 having elongated openings 46, 46 therein through which the conveyor 14 and the gelatinous material pass.

Upon removal of the gelatinous material from the cooling chamber 37 it is conveyed upwardly in the dryer housing on the upwardly inclined discharge end 14b of the conveyor 14. Immediately adjacent the discharge end of the conveyor 14 is a doffer plate 47 formed for example as illustrated in Fig. 7 which engages the continuous strip of gelatinous material and removes the same from the conveyor 14. Extending transversely of the dryer housing in spaced parallel relation with the doffer plate 45 is a rotatably mounted picker cylinder 48 which is driven continuously in the counterclockwise direction relative to Fig. 7 by means of conventional drive mechanism (not shown). The picker cylinder 48 has a plurality of series of forwardly inclined cutting teeth 49 spaced uniformly about the periphery thereof and spaced apart longitudinally of the picker cylinder. The cutting teeth 49 terminate at a point adjacent the discharge edge of the doffer plate 47 and engage the gelatinous material as it leaves the doffer plate 47. The teeth 49 cut the gelatinous material longitudinally in a manner very similar to that of a rotary saw blade but the teeth are spaced far enough apart so that the material does not build up between the teeth and interfere with the cutting action of the teeth. By this construction the teeth of the picker cylinder 49 cut longitudinally into the continuous strip of gelatinous material at predetermined points transversely of the continuous strip of gelatinous material and then break generally rectangular segments 36 off of the strip of gelatinous material 21 and deposit the same in a uniform bed approximately 15 to 18 inches deep on the conveyor 15 as illustrated in Fig 7.

Fig. 8 of the drawing illustrates a modified apparatus for breaking the continuous strip of gelatinous material into the segments 36 and depositing the same on the conveyor 15 to form a bed of gelatinous material approximately 15 to 18 inches deep. In the form illustrated in Fig. 8 a shaft 50 extends transversely of the dryer housing adjacent the discharge end of the conveyor 14b in spaced parallel relation therewith. A plurality of series of breaker bars 51 extend radially outward from the shaft 50 and are spaced apart longitudinally of the shaft a predetermined distance. The gelatinous material is removed from the conveyor 14 by means of a doffer plate 52 extending transversely of the drier housing immediate adjacent the discharge end of the conveyor 14. In addition, a plurality of anvils 53, corresponding in number to the sets of breaker bars 51 extend outwardly from the doffer plate 52 immediate adjacent each set of breaker bars. The shaft 49 rotates in the counterclockwise direction relative to Fig. 8 and during rotation thereof causes the breaker bars to engage the upper surface of the gelatinous material adjacent the anvils 53 and break the gelatinous material into segments 36 which are then deposited on the feed end of the conveyor 15 to form a bed of uniform thickness thereon.

According to the present invention, after the continuous strip of gelatinous material initially deposited on the conveyor 14 is broken into the generally rectangular segments 36 of gelatinous material and deposited on the foraminous conveyor 15, the gelatinous material is further dried to complete the drying operation and then cooled and removed from the drier housing for further treatment or use in segmental form. The drying operation is completed in a drying chamber 54 immediate adjacent the feed end of conveyor 15 wherein motor-driven fan units 55, 55 force a drying medium maintained at a temperature of approximately 115 to 150° F. downwardly through the bed of gelatinous material supported by the conveyor 15 and recirculate the drying medium through heating units, not shown, and thence back to the drying chamber 54. The construction of the drying chamber 54 and the passage of the drying medium therethrough is the same as that of the previously described drying chamber 28.

Upon removal of the gelatinous material from the drying chamber 54, the conveyor 15 transports the material through a cooling chamber 56, formed as illustrated in Figs. 1b and 2b, wherein cooling air at approximately 75° F. is forced downwardly through the bed of gelatinous material supported by the conveyor 15. The construction of the cooling chamber 56 is exactly the same as the construction of the cooling chamber 37 illustrated and described in conjunction with Fig. 6, and comprises an inlet duct 57 which conveys cooling medium to the chamber 56 and a centrifugal blower 58 which forces the cooling downwardly through the material supported on the conveyor 15. A return duct 59 and cooling air outlet 60 similar to the return duct 41 and outlet 42, permit a portion of the cooling air to be replaced by fresh cooling air. A dead air space 61 formed by a pair of spaced-apart parallel walls 62, 62 extending transversely of the drier housing and having openings 63, 63 therein through which the conveyor 15 and bed of gelatinous material pass insulates the cooling chamber 56 from the drying chamber 54.

Upon leaving the cooling chamber 56, the gelatinous material carried by the conveyor 15 is conveyed toward the discharge end 15b of the conveyor 15 and is dropped off the end of the conveyor into the path of a breaker cylinder 64 which separates the segments 36 of the gelatinous material from one another and deposits the same in a completely dry state on a discharge conveyor 65 which, in turn, transports the dried gelatinous material to further treating apparatus or storage bins as desired.

From the foregoing it will be apparent that the present invention provides novel apparatus for drying gelatinous material in a porous mass and discharging the dried gelatinous material in condition for further treatment or use without any manual handling of the material. In addition it will be apparent that the present invention provides novel apparatus wherein chilled strips of gelatinous material, such as glue, may be deposited on a conveyor in porous strip forms of uniform thickness, partially dried, and thereafter formed into generally rectangular porous segments and deposited on a second conveyor wherein the drying process is completed.

While particular embodiments of the present invention have been illustrated and described herein it is not intended to limit the invention to such a disclosure and changes and modifications may be incorporated and embodied therein within the scope of the following claims:

We claim:

1. Apparatus for drying gelatinous material comprising a dryer housing containing a plurality of drying chambers, a first conveyor traveling longitudinally through at least one of said drying chambers, a second conveyor traveling longitudinally through at least one other of said drying chambers and having its feed end disposed beneath the discharge end of said first conveyor, a cooling chamber in said housing disposed intermediate said one drying chamber and the discharge end of said first conveyor, means to deposit gelatinous material in a continuous porous mass of uniform thickness on said first conveyor, a doffer plate extending transversely of the drying housing adjacent the discharge end of the first conveyor operable to remove the material from the discharge end of the first conveyor, and material cutting apparatus mounted transversely of the drying housing adjacent said doffer plate operable to engage the material leaving the doffer plate and divide the same into generally uniform segments.

2. Apparatus for drying gelatinous material comprising a dryer housing containing a plurality of drying chambers, a first conveyor traveling longitudinally through at least one of said drying chambers and having its discharge end at approximately the mid-point of said housing, drive means for said first conveyor operable to drive said first conveyor at a predetermined speed, a second conveyor traveling longitudinally through at least one other of said drying chambers and having its feed end disposed beneath the discharge end of said first conveyor, drive means for said second conveyor operable to drive said second conveyor at a predetermined speed slower than the speed of said first conveyor, a cooling chamber in said housing disposed intermediate said one drying chamber and the discharge end of said first conveyor, means to deposit gelatinous material in a continuous porous mass of uniform thickness on said first conveyor, a doffer plate extending transversely of the drying housing adjacent the discharge end of the first conveyor operable to remove the material from the discharge end of the first conveyor, and material cutting apparatus mounted transversely of the drying housing adjacent said doffer plate operable to engage the material leaving the doffer plate and divide the same into generally uniform segments, said cutting apparatus operable to deposit said segments on said second conveyor in a layer of uniform thickness substantially thicker than the layer of material on said first conveyor.

3. Apparatus for drying gelatinous material comprising a dryer housing containing a plurality of drying chambers, means to circulate drying medium through said plurality of drying chambers, a first conveyor traveling longitudinally through at least one of said drying chambers and having its discharge end at approximately the mid-point of said housing, a second conveyor traveling longitudinally through at least one other said drying chambers and having its feed end disposed beneath the discharge end of said first conveyor, a cooling chamber in said housing intermediate said one drying chamber and the discharge end of said first conveyor, means to circulate a cooling medium through said cooling chamber, means to deposit gelatinous material in a continuous porous mass of uniform thickness on said first conveyor, a doffer plate extending transversely of the drying housing adjacent discharge end of the first conveyor operable to remove the material from the discharge end of the first conveyor, a continuous rotating shaft extending transversely of said housing adjacent the discharge end of said first conveyor in spaced parallel relation therewith, material severing members projecting outwardly from said shaft operable to engage said material as it leaves said doffer plate, sever the same into generally uniform segments and deposit said segments in a mass of uniform thickness on said second conveyor.

4. Apparatus for drying gelatinous material comprising a dryer housing having a feed end and a discharge end, a first endless foraminous conveyor having a feed end and a discharge end traveling longitudinally of said housing with the feed end thereof at the feed end of the housing and the discharge end thereof terminating approximately midway of the housing, a second foraminous conveyor having a feed end and a discharge end traveling longitudinally of said housing, said second conveyor having its feed end disposed beneath the discharge end of said first conveyor and the discharge end thereof at the discharge end of said housing, feed mechanism disposed above the feed end of said first conveyor to deposit gelatinous material in a continuous gas-permeable mass of predetermined thickness on said first conveyor, a first drying chamber in said housing adjacent the feed end thereof through which said first conveyor travels, blower means in said first drying chamber operable to force drying medium depthwise through the gelatinous material on said first conveyor and partially dry the same, a cooling chamber intermediate said first drying chamber and the discharge end of said first conveyor for containing a cooling medium operable to cool the gelatinous material carried by said first conveyor, means to circulate a cooling medium through said cooling chamber, a doffer plate extending transversely of the dryer housing adjacent the discharge end of said first conveyor operable to remove said material from said conveyor, material cutting apparatus mounted transversely of the drier housing forwardly adjacent said doffer plate operable to engage the material upon leaving the doffer plate and divide the same into uniform segments, said apparatus operable to deposit said segments on said second conveyor in a layer of uniform thickness, a second drying chamber in said housing through which said second conveyor travels, and blower means in said second drying chamber operable to force drying medium depthwise through the gelatinous material and dry the same.

5. Apparatus for drying gelatinous material comprising a dryer housing having a feed end and a discharge end, a first endless foraminous conveyor having a feed end and a discharge end traveling longitudinally of said housing with the feed end thereof at the feed end of the housing and the discharge end thereof terminating approximately midway of the housing, drive means for said first conveyor operable to drive said first conveyor at a predetermined speed, a second foraminous conveyor having a feed end and a discharge end traveling longitudinally of said housing, drive means for said second conveyor operable to drive said second conveyor at a predetermined speed slower than the speed of said first conveyor, said second conveyor having its feed end disposed beneath the discharge end of said first conveyor and the discharge end thereof at the discharge end of said housing, chilling and cutting apparatus adjacent the feed end of said housing operable to convert liquid gelatinous material to sheet form and cut the same into small strips, feed mechanism disposed above the feed end of said first conveyor to receive said strips and deposit the same in a continuous gas-permeable mass of predetermined thickness on said first conveyor, a first drying chamber in said housing adjacent the feed end thereof through which said first conveyor travels, blower means in said first drying chamber operable to force drying medium depthwise through the gelatinous material on said first conveyor and partially dry the same, a cooling chamber intermediate said first drying chamber and the discharge end of said first conveyor for containing a cooling medium operable to cool the gelatinous material carried by said first conveyors, means to circulate a cooling medium through said cooling chamber, a doffer plate extending transversely of the drier housing adjacent the discharge end of said first conveyor operable to remove said material from said conveyor, material cutting apparatus mounted transversely of the drier housing forwardly adjacent said doffer plate operable to engage the material upon leaving the doffer plate and divide the same into uniform segments, said apparatus operable to deposit said segments on said second conveyor in a layer of uniform thickness substantially thicker than the layer of material on said first conveyor, a second drying chamber in said housing through which said second conveyor travels, and blower means in said second drying chamber operable to force drying medium depthwise thorugh the gelatinous material and dry the same.

6. Apparatus for drying gelatinous material comprising a dryer housing having a feed end and a discharge end, a first endless foraminous conveyor having a feed end and a discharge end traveling longitudinally of said housing with the feed end thereof at the feed end of the housing and the discharge end thereof terminating approximately midway of the housing, drive means for said first conveyor operable to drive said first conveyor at a predetermined speed, a second foraminous conveyor having a feed end and a discharge end traveling longitudinally of said housing drive means for said second conveyor operable to drive said second conveyor at a predetermined speed slower than the speed of said first conveyor, said second conveyor having its feed end disposed beneath the discharge end of said first conveyor and the discharge end thereof at the discharge end of said housing, chilling and cutting apparatus adjacent the feed end of said housing operable to convert liquid gelatinous material to sheet form and cut the same into small strips, feed mechanism disposed above the feed end of said first conveyor to receive said strips and deposit the same in a continuous gas-permeable mass of predetermined thickness on said first conveyor, a first drying chamber in said housing adjacent the feed end thereof through which said first conveyor travels, blower means in said first drying chamber operable to force drying medium depthwise through the gelatinous material on said first conveyor and partially dry the same, a first cooling chamber intermediate said first drying chamber and the discharge end of said first conveyor for cooling the gelatinous material carried by said first conveyor, means to circulate a cooling medium through said first cooling chamber, a doffer plate extending transversely of the drier housing adjacent the discharge end of said first conveyor operable to remove said material from said conveyor, material cutting apparatus mounted transversely of the drier housing forwardly adjacent said doffer plate operable to engage the material upon leaving the doffer plate and divide the same into uniform segments, said apparatus operable to deposit said segments on said second conveyor in a layer of uniform thickness substantially thicker than the layer of material on said first conveyor, a second drying chamber in said housing through which said second conveyor travels, blower means in said second drying chamber operable to force drying medium depthwise through the gelatinous material and dry the same, a second cooling chamber intermediate said second drying chamber and the discharge end of said housing operable to cool the gelatinous material carried by said second conveyor, means to circulate a cooling medium through said second cooling chamber, and means adjacent the discharge end of said housing to remove the gelatinous material from said second conveyor.

References Cited in the file of this patent

UNITED STATES PATENTS

| | | |
|---|---|---|
| 312,342 | Duryea | Feb. 17, 1885 |
| 1,949,427 | McComb | Mar. 6, 1934 |
| 1,981,806 | Lowry | Nov. 20, 1934 |
| 2,142,568 | Lowry | Jan. 3, 1939 |
| 2,366,779 | Gaumer | Jan. 9, 1945 |
| 2,383,694 | Steiner | Aug. 28, 1945 |
| 2,452,983 | Birdseye | Nov. 2, 1948 |
| 2,751,687 | Colton | June 26, 1956 |
| 2,764,819 | Hallman | Oct. 2, 1956 |

UNITED STATES PATENT OFFICE

CERTIFICATE OF CORRECTION

Patent No. 2,937,454  May 24, 1960

John F. Scott et al.

It is hereby certified that error appears in the printed specification of the above numbered patent requiring correction and that the said Letters Patent should read as corrected below.

Column 5, line 57, beginning with "1. Apparatus for drying gelatinous material" strike out all to and including "generally uniform segments." in line 75, same column, comprising claim 1; for the claim numbers "2", "3", "4", "5" and "6" read -- 1, 2, 3, 4 and 5 --; in the heading to the printed specification, line 9, for "6 Claims." read -- 5 Claims. --.

Signed and sealed this 15th day of November 1960.

(SEAL)
Attest:

KARL H. AXLINE
Attesting Officer

ROBERT C. WATSON
Commissioner of Patents